Nov. 3, 1964 C. G. DUENKE 3,155,951
TESTING APPARATUS FOR TEMPERATURE WARNING DEVICE
Filed Jan. 16, 1961
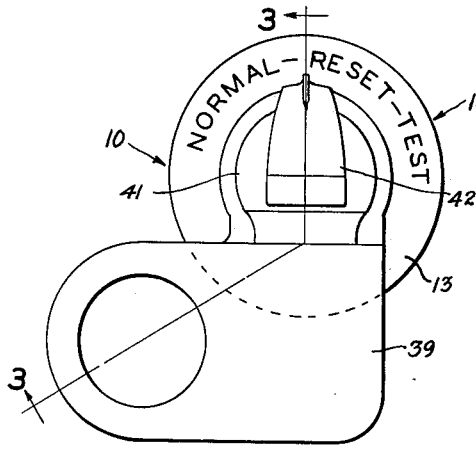
FIG. 1.
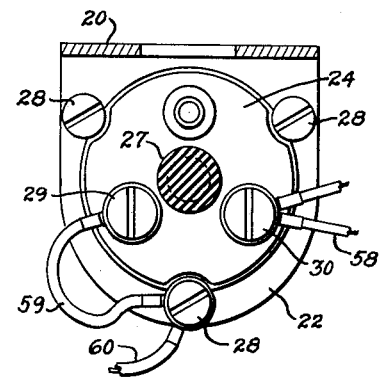
FIG. 2.
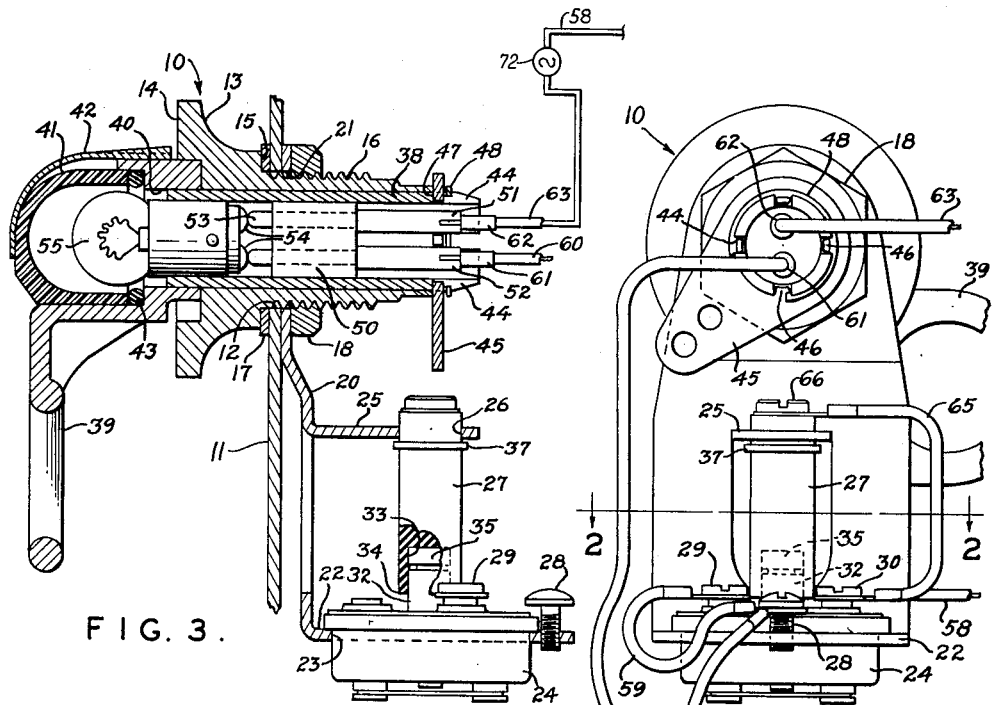
FIG. 3.
FIG. 4.
INVENTOR.
CLARENCE G. DUENKE
BY
Kingland, Rogers & Ezell
ATTORNEYS

United States Patent Office 3,155,951
Patented Nov. 3, 1964

3,155,951
TESTING APPARATUS FOR TEMPERATURE
WARNING DEVICE
Clarence G. Duenke, St. Louis, Mo., assignor to The
Clarken Company, St. Louis, Mo., a corporation of
Missouri
Filed Jan. 16, 1961, Ser. No. 83,043
5 Claims. (Cl. 340—214)

This invention relates to a temperature responsive warning device, and particularly to a means for testing such a warning device. The warning device is typically the type having a thermostat for sensing temperatures and for energizing a lamp or other indicator upon sensing a temperature above a predetermined maximum. The thermostat employed is one that must be manually reset, and the testing means is arranged to operate through the reset apparatus.

Certainly there have been thermostatic connections to an indicating apparatus for indicating the fact that the temperature in a particular area is above some predetermined value. Such arrangements have found special utility in providing a warning that a transformer is being overloaded.

While thermostatically controlled temperature warning devices have been used heretofore, and such devices have employed a lamp or other indicating means connected in a series circuit with the thermostat, there has not been provided any way for testing the lamp or indicating means. Hence, there is the problem that the indicator must be either removed from the warning device and separately tested, or the warning device must otherwise be expected to fail to perform its intended function.

The present temperature responsive indicator and warning device includes a thermostat which is responsive to excessive temperatures to close an electrical contact. The thermostat is connected in series to an indicator in the form of an electric light bulb. The thermostat is so constructed that once it has closed, it will remain closed until manually or externally reset. The resetting operation is accomplished by means of a plunger mounted to reciprocate above the thermostat and having an element that will move to break the thermostat contact when the plunger is depressed.

The plunger and its thermostat are supported by an electrically conducted frame, and also connected to the frame is an electrically conductive bushing or sleeve. There is a hollow shaft rotatably journaled within the sleeve and having a lever arm or switch arm connected to it for depressing the plunger upon rotation.

The special feature of the invention, which is the means for testing the indicator lamp, comprises certain electrical connections and circuitry that form a short circuit parallel to and bypassing the thermostat, which short circuit includes in it the plunger and the switch arm. By this short circuit arrangement, when the lamp is to be tested, the lever arm or operating element can be rotated to the same position as would be the condition for resetting the thermostat. Upon such rotation of the operating element, the short circuit around the thermostat will be closed so that the lamp can be tested.

Accordingly, an important object of the invention is to provide a temperature sensitive warning device having an indicator circuit with a thermostat connected in parallel with the indicator, and having means for testing the indicator.

Another object of the invention is to provide a temperature warning device with a thermostatically controlled indicator in which the thermostat remains in actuating condition upon sensing a temperature above a predetermined maximum until it is reset, and wherein there are means for resetting the thermostat, which means includes means for testing the indicator.

Still another object of the invention is to provide a temperature warning device having a thermostat for sensing temperatures above a predetermined maximum, the thermostat being connected in series with an indicator, with means for testing the indicator comprising only a small number of connections that are inexpensive to make.

There are other objects and advantages that will appear from the description to follow.

In the drawings:
FIGURE 1 is a front elevation view of the invention showing the operating element or lever;
FIGURE 2 is a view in section taken along the line 2—2 of FIGURE 4;
FIGURE 3 is a view in section taken along the line 3—3 of FIGURE 1; and
FIGURE 4 is a rear elevation view of the temperature responsive warning device.

Turning now to the drawing, the temperature responsive warning device is designated generally by the numeral 10, and is illustrated as being mounted to a conventional wall or plate 11. The plate 11 has a hole 12 through it for receiving a bronze bushing or sleeve 13 that forms a part of the body of the device 10.

The sleeve 13 has an enlarged forward face 14 and an annular shoulder 15 that is spaced rearwardly of the face 14. The reduced rearward section 16 of the body or sleeve 13 is threaded and extends through the hole 12. There is a washer 17 between the shoulder 15 of the sleeve 13 and the plate 11, and a nut 18 fastens the sleeve 13 to the plate 11.

Also fastened to the sleeve 13 is a frame 20 having a hole 21 through its upper end for fitting over the threaded portion 16 of the sleeve 13. The frame 20 has a lower shelf 22 with a hole 23 through it into which is seated a thermostat 24. Above the shelf 22, there is another shelf 25 formed by bending a central portion of the frame 20 upwardly to a horizontal position. The shelf 25 has a hole 26 through it for receiving the upper end of a plunger 27. The plunger is formed of hard rubber or other insulating material.

The thermostat 24 is fastened to the shelf 22 in any conventional manner, as by bolts 28, one of which is to act as a ground terminal. The thermostat 24 is a conventional type that operates in response to temperature changes. There are internal switch elements within the thermostat, one of which is in electrical communication with a terminal post 29 and the other of which is in electrical connection with a terminal post 30, both terminal posts being accessible externally of the thermostat. When the thermostat 24 senses a temperature above a predetermined maximum, the switch elements within the thermostat make contact to establish an electrical connection between the terminal posts 29 and 30.

It should be appreciated that the thermostat 24 is designed so that the switch elements before mentioned will remain closed once the sensed temperature has risen above the aforesaid predetermined maximum. Thereafter, an external force must be applied to open the electrical connection between the terminal posts 29 and 30. The external force derives from the plunger 27.

The thermostat 24 has an upstanding sleeve 32, and there is a recess 33 through the bottom 34 of the plunger 27 for receiving the sleeve 32. The plunger can slide along the sleeve 32. The thermostat 24 is further designed to be opened by a pin 35 that extends within the sleeve 32 so that when the pin 35 is depressed within the sleeve 32, the thermostat 24 will be opened. The head of the pin 35 is engaged by the top of the recess 33 within the plunger 27 and is therefore depressed upon depressing of the plunger.

Fastened about the sleeve 27 immediately below the shelf 25 is a wire spring or clip 37 that limits the upper movement of the sleeve 27.

There is a hollow shaft 38 that extends through the sleeve 13. A cast operating handle 39 is fixed to the forward end of the shaft 38, so that the shaft 38 can be rotated within the sleeve 13 by operation of the handle 39. The upper part 40 of the handle casting 39 is open, but is covered by a plastic dome 41 which is transparent enough to transmit light. A metal retainer 42 clamps the dome 41 against a washer 43 that is between the upper part 40 of the handle and the dome 41. The retainer 42 covers only part of the dome 41.

The rearward end of the shaft 38 has a plurality of longitudinal kerfs 44 cut into it, and there is an actuating arm 45 that is slid over the rearward end of the hollow shaft 38, the actuating arm 45 having small projections 46 that cooperate with adjacent ones of the kerfs 44 for preventing rotation of the lever arm 45 relative to the shaft 38.

A lever arm 45 abuts against a shoulder 47 formed on the shaft 38, and the shoulder 47 limits the forward movement of the lever arm 45. Rearward of the lever arm 45, there is a spring clip 48 for locking the lever arm onto the shaft 38.

A porcelain insulator 50 is wedged within the hollow shaft 38, and passed through the insulator 50 are a pair of conductive pins 51 and 52. The forward ends 53 of the pins 51 and 52 project forwardly of the insulator 50 and are in contact with a pair of contact points 54 of a light bulb 55.

The wiring for the indicator is as follows. From a conventional external electrical power supply 72 (shown diagrammatically in FIG. 3) a wire 58 is connected to the terminal post 30 of the thermostat 24, as best seen in FIG. 2. As already mentioned, the contacts 29 and 30 have internal connections within the thermostat 24 that are closed upon sensing by the thermostat of certain high temperatures and that are opened upon depression of the plunger 27. The circuit is continued by a wire 59 that is connected to the terminal post 29 at one end and at its other end to one of the bolts 28 that fastens the thermostat 24 to the shelf 22 of the frame 20.

Also connected to the terminal post 28 is one end of a wire 60 and attached to the other end of the wire 60 is a suitable pin 61 for insertion into a suitable recess within the pin 52. The circuit passes through the pin 52 and the lamp 55 and back through the pin 51. There is a pin 62 in contact with the pin 51, and a wire 63 that is connected to the pin 62 completes the circuit back through the source of electrical energy 72.

The circuit just outlined is the circuit that causes the lamp 55 to be lighted when the thermostat 24 senses a temperature high enough to cause its internal contacts to close the circuit.

In order to provide a short circuit around the thermostat 24 so that the lamp 55 can be tested, there is an electrical connection between the terminal post 30 and the top of the plunger 27. This connection comprises an insulated wire 65 having one end connected to the terminal post 30 and the other end connected to a screw 66 that is threaded into the top of the plunger 27. Under normal operating conditions of the indicator, the circuit through the wire 65 is opened because the lever arm 45 is out of contact with the screw 66.

When it is desired to test the lamp 55, the handle 39 is operated to rotate the shaft 38 and the lever arm 45. When the lever arm 45 engages the screw 66, there is a circuit that is completed from the source 72, through the wire 58, the wire 65, the screw 66, the lever arm 45 (which is constructed of an electrically conductive metal), the hollow shaft 38, the plate 11, and a frame 20 (all of which are formed of electrically conductive metal), the ground terminal post 28, the wire 60, through the lamp 55 by way of the pins 51 and 52, and back to the source of electrical energy 72 by way of the wire 63.

According to the invention, therefore, the thermostat 24 can be reset or the lamp can be tested by the same operation of the handle. Of course, both operations would not be performed at the same time because the testing of the lamp would ordinarily be done at a time when the thermostat contacts are open and resetting unnecessary. Such testing is accomplished by operating the handle until the lever arm 45 contacts the screw 66.

When the thermostat contacts have closed, the lamp 55 will be lighted indicating that a device being protected against overheat (such as a transformer) has reached a temperature above some predetermined maximum. Because of the design of the thermostat, as already explained, the lamp will remain lit until the thermostat is reset. The resetting is accomplished by operation of the handle to move the lever arm 45 over the plunger 27 so that the plunger and the pin 35 are depressed to reset the thermostat. The arcuate side edge surface of the lever arm 45 contacts the screw 66. As the handle and lever arm 45 are moved, the rounded cam-like end of the lever arm 45 depresses the screw 66 and the plunger 27, thereby carrying the pin 35 downward to open the switch elements of the thermostat 24.

Various changes and modifications may be made within the process of this invention as will be readily apparent to those skilled in the art. Such changes and modifications are within the scope and teaching of this invention as defined by the claims appended hereto.

What is claimed is:

1. A temperature warning device comprising an indicator, temperature responsive thermostat, and a source of electrical energy, all wired in series, the circuit being normally held open by the thermostat and the thermostat having temperature sensitive switch elements for closing the circuit upon sensing a temperature above a predetermined maximum, a short circuit across the thermostat, normally open switch means in the short circuit, the switch means including means for releasing the thermostat from circuit closing condition when the switch means is closed, and a movable actuating member for opening and closing the switch means, the switch means comprising a contact arm connected to the actuating member for a movement therewith, and the releasing means comprising a movable plunger adapted to be depressed by the contact arm, the short circuit being closed when the contact arm contacts the plunger.

2. A temperature warning device comprising a frame, an indicator, a thermostat supported by the frame, a sleeve fastened to the frame in spaced relation to the frame, a shaft rotatably mounted within the sleeve, a contact arm fixed to the shaft, and a plunger supported above the thermostat, the thermostat and the indicator being series wired to a source of electrical energy, the thermostat being movably open and being responsive to temperatures above a predetermined maximum for closing the circuit, the plunger being movable to open the thermostat, the plunger being in the path of rotation of the contact arm and being depressible by the contact arm to open the thermostat, and a short circuit across the thermostat for testing the lamp, the short circuit including the frame, the sleeve, the contact arm and the plunger.

3. The combination of claim 2 wherein the circuit having in it the thermostat and the indicator includes an electrical connection between the one terminal of the source of electrical energy and one side of the thermostat, and an electrical connection between the other side of the thermostat to the frame, an electrical connection between the frame and one side of the indicator and an electrical connection from the other side of the indicator to the other terminal of the source of electrical energy.

4. A temperature warning device comprising an indicator, a temperature responsive thermostat, and a source of electrical energy, all wired in series, a shaft, means for rotating the shaft, said thermostat being operable upon sensing heat above a pre-determined temperature to energize the indicator, means controlled by the shaft for returning the thermostat to de-energizing condition, the last-mentioned means comprising a part of a short circuit connected between said source of electrical energy and said indicator, said short circuit shunting the thermostat to test the indicator, a switch arm connected to rotate with the shaft, and a plunger slidably connected to the thermostat in the path of the switch arm for returning the thermostat to de-energizing condition upon depression by the switch arm, the switch arm and the plunger being part of the short circuit so that when they make contact, the indicator can be tested.

5. A temperature warning device comprising an indicator, a shaft, means for rotating the shaft, a source of electrical energy, a normally open thermostat connected to said source of electrical energy and operable upon sensing heat above a pre-determined temperature to energize the indicator, the thermostat being spaced from the axis and the shaft, and being fixed in position relative thereto, the thermostat having a plunger movable toward the shaft and depressible away from the shaft, the plunger causing the thermostat to be opened when depressed, a lever arm connected to rotate with the shaft to depress the plunger, and a short circuit connected between said source of electrical energy and said indicator, said short circuit including the lever arm and the plunger connected across the thermostat for testing the lamp when the lever contacts the plunger.

References Cited by the Examiner

UNITED STATES PATENTS

| 581,544 | 4/97 | Enholm et al. | 340—214 |
| 1,087,300 | 2/14 | Knox et al. | 200—153.13 |
| 1,740,225 | 12/29 | Cummins | 200—153.13 |
| 2,623,099 | 12/52 | Wallace et al. | 340—214 |
| 2,686,300 | 8/54 | Barr | 340—227 X |
| 2,710,955 | 6/55 | Hallerberg et al. | 340—214 X |
| 2,718,636 | 9/55 | Harrington et al. | 340—252 X |

NEIL C. READ, *Primary Examiner.*

BENNETT G. MILLER, *Examiner.*